Dec. 2, 1952        D. F. SKLAR        2,619,831
HARDNESS TESTER AS A FUNCTION OF TIME
Filed March 5, 1946        2 SHEETS—SHEET 1
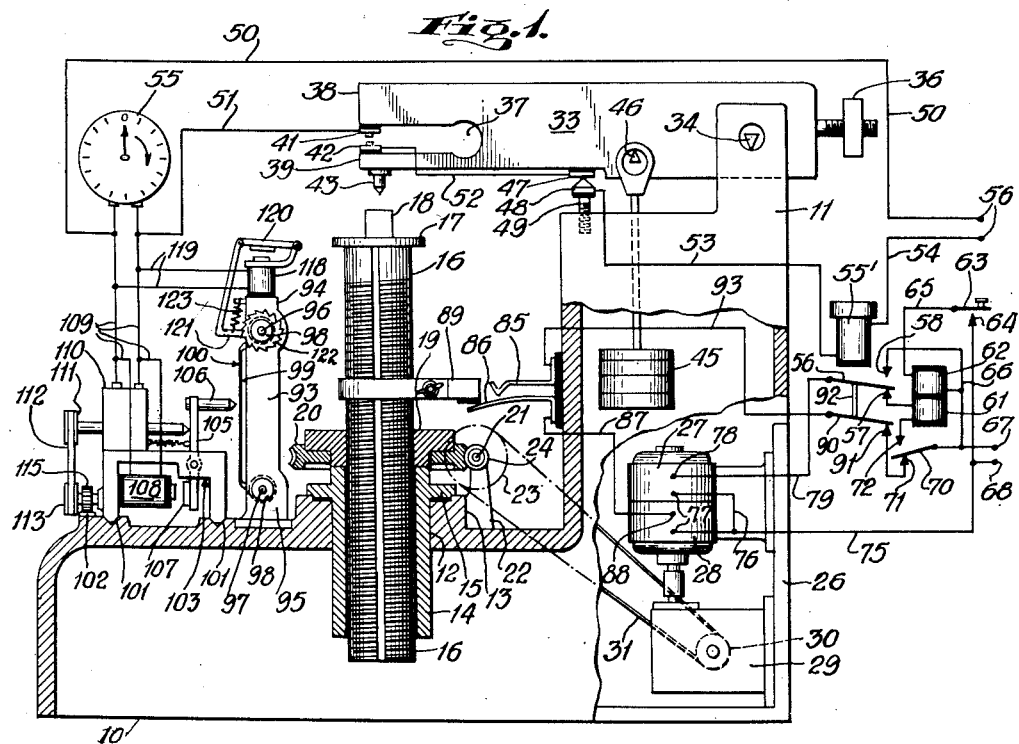
INVENTOR
DAVID F. SKLAR
BY
ATTORNEY Dec. 2, 1952 D. F. SKLAR 2,619,831
HARDNESS TESTER AS A FUNCTION OF TIME
Filed March 5, 1946 2 SHEETS—SHEET 2

INVENTOR
DAVID F. SKLAR
BY H. M. Kilpatrick
ATTORNEY

Patented Dec. 2, 1952

2,619,831

UNITED STATES PATENT OFFICE 2,619,831

HARDNESS TESTER AS A FUNCTION OF TIME

David F. Sklar, Brooklyn, N. Y., assignor, by mesne assignments, to American Chain & Cable Company, Inc., a corporation of New York Application March 5, 1946, Serial No. 652,006

34 Claims. (Cl. 73—83)

This invention relates to hardness testing and to hardness testing machines and apparatus and more particularly to apparatus in which a penetrator is forced to make an indentation in the piece to be tested.

One object of the invention is to provide an improved apparatus of this kind by means of which the hardness may be more easily accurately measured than with similar machines heretofore.

Other objects of the invention are to provide an improved machine of this kind in which the penetrator and test piece are automatically moved together for testing and then removed and in which the hardness is automatically recorded at the machine or at a distance therefrom.

In hardness testers of the well known Rockwell type, the hardness is measured as a function of the distance of penetration into the test piece. The actual distance of penetration is very small and the differences of these distances for test pieces of nearly the same hardness are extremely small, and in order to be able to read these extremely small distances systems of levers have been used as a multiplying means to greatly multiply on the dial of the indicator the extremely small distances. On account of the lost motion, yieldability, elasticity and inertia of the parts of such systems extreme accuracy is impossible.

On the other hand, with my system, hardness is measured as a function of lapsed time. This time which is to be measured can be extended to any amount by slowing the process of indentation whereas depth of indentation cannot be extended at all, except through amplifying mechanism having many mechanical defects.

For convenience or speed mechanism may be employed in said measurement of lapsed time, but well known means exist for such measurement, electrically, that have negligible errors from lost motion, yieldability, elasticity and inertia and therefore are of a much higher order of precision than known methods for measuring distance.

If measurement of hardness is to be a function of time and, as in the case of certain known hardness testing devices, a minor load indentation is to be the reference point for measuring the depth of indentation caused by a superimposed major load, it is evident that the establishment of the reference point is of prime importance, and by employing time as a function of hardness it is possible electrically to establish that reference point very exactly.

Therefore the principal object of the invention is to effect the measurement of hardness as a function of time.

Additional objects of the invention are to effect simplicity and efficiency in such apparatus and to provide a relatively simple apparatus of this kind which is durable, and reliable in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with several forms of hardness testers each of which briefly stated, includes a test piece support and a penetrator support with synchronous electric motor means for causing constant-speed relative approach of said supports to cause the application to the penetrator of a load means for yieldably resisting movement of the penetrator, when engaged by a test piece on the test piece support during said approach, until the resistance of the minor load is overcome thus effecting relative movement of the minor load means, continuation of said constant-speed approach causing the application to the penetrator of a major load means for yieldably resisting further movement of the penetrator during said approach to effect progressive penetration until the speed of penetration becomes less than the speed of said approach and the resistance of said major load means is overcome thus effecting a movement of the major load means. Means are provided for accurately measuring the elapsed time between said movements, this elapsed time being an inverse function of the hardness.

In the accompanying drawing showing, by way of example, three of many possible embodiments of the invention, Fig. 1 is a vertical sectional view, partly in elevation, showing one form of hardness tester and showing the electrical connections diagrammatically, the section being taken substantially on the line 1—1 of Fig. 2, looking in the direction of the arrows of said line;

Fig. 2 is a plan of the tester of Fig. 1;

Fig. 5 is a side elevation showing another form of penetrator assembly.

Figure 3:
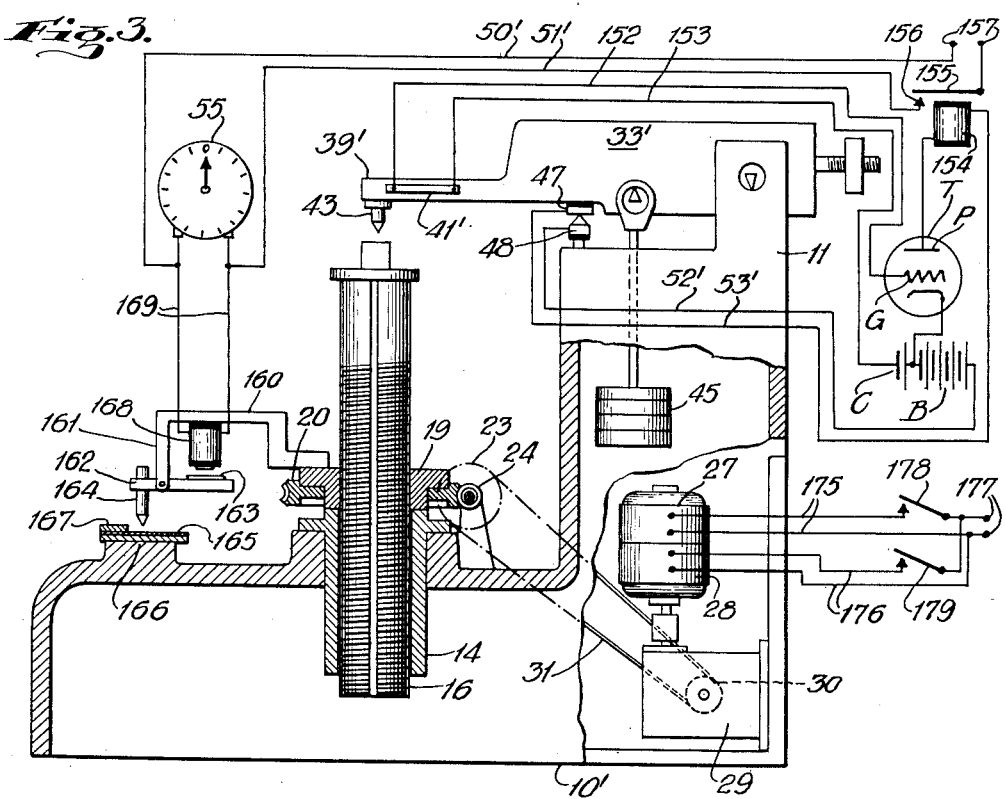
Fig. 3 is a longitudinal sectional view, partly in elevation, partly in diagram, showing another form of hardness tester.

The various parts of the improved hardness tester as shown in Figs. 1 and 2 are mounted on an elongated base 10 having a hollow standard 11 at one end and at its mid-part an axially vertical opening 12 surrounded by a boss 13 receiving a bearing bushing 14 having at its upper part a flange 15 resting on the boss. An elevating screw 16 vertically slidable in said bushing is provided at the top with a test piece support 17 adapted to receive a test piece or specimen 18; and an internally threaded flanged collar or nut 19 receiving said screw rests on said bushing and has threaded engagement with the screw. A worm wheel 20 is mounted fast on the collar; and a drive shaft 21 (Fig. 2), mounted transversely of the base in bearings 22 on the base carries an end pulley 23 and also a worm 24 meshed with the worm wheel 20.

Said base is provided with a large exterior recess 25 at its rear corner adjacent to the standard and a vertical flange 26 joining the standard at the recess, on which flange are mounted a reversing synchronous motor or motors 27, 28, operating on controlled frequency, and a reduction gear 29 driven by the motor and provided with a drive pulley 30 connected by a belt 31 to said end pulley 23, whereby said screw and the test piece 18 may be raised and lowered at uniform controlled speed.

The motor means 27, 28 may be a reversing motor or a double motor comprising separate motor elements rotary in opposite directions for raising and lowering the test piece.

A beam 33 disposed above said test piece support, base and standard has near its rear end knife edges 34 fulcrumed in bearings on the upper end of the standard, the rear end of the beam being provided with an adjustable counterbalance 36. The front end portion of the beam is provided with a long gap or slot 37 dividing the beam into a thick upper member 38, and a firmly resilient lower minor-load spring member 39, said members at the outer end being respectively provided with upper and lower normally open minor load electrical contacts 41, 42 both being shown insulated from the respective members. A downwardly pointed penetrator 43 is mounted on the outer end of the minor load member coaxially above the test piece support; and a major load 45 hangs in the standard on an intermediate part of the beam on knife edges 46 carried by the beam. Upper and lower normally closed major load contacts 47, 48 are respectively carried by, and insulated from, the lower face of an intermediate part of the beam and a part of the upper face of the standard immediately thereunder, the lower contact being carried on a screw 49 adjustably received in a tapped bore in the top face of the standard. All the contacts 41, 42, 47, 48 are shown as insulated but it is not necessary that all be insulated, as some could be grounded on the machine.

Conductors 50, 51, 52, 53, 54 connect a visual synchronous-motor clock 55, the minor load contacts 41, 42, the major load contacts 47, 48 in series between the terminals 56 of a source of alternating controlled frequency current to provide a timing circuit. The test piece 18 on the support rising at uniform speed will engage and raise the penetrator 43, apply the load of the minor load spring member 39 to the penetrator, and close the minor load contacts 41, 42, thus starting the clock; whereupon the penetrator will relatively move further into the test piece until the resistance of the test piece becomes great enough to raise the penetrator and the major load 45, thus breaking the major load contacts and stopping the clock, allowing to be read on the clock, the length of time required to lift the major load, which time is an inverse function of the hardness.

Any convenient means for controlling the motor may be used, but I show herein automatic manually started apparatus for driving the motor for causing the rising of the test piece and to automatically stop said rising and lower the test piece when the major load is raised. Said apparatus includes a timed relay comprising an electromagnet 55' having its coil interposed in conductors 53, 54 of the timing circuit and an elevating switch comprising a normally retracted armature carrying a movable contact 56, a normally engaged back contact 57 and a normally disengaged front contact 58.

Manual means for starting the apparatus includes a starting relay having a starting magnet having a holding coil 61, a starting coil 62 and a normally open manually operated starting switch 63 connected by conductors 64, 65, 66 in series with the starting coil 62 between controlled frequency main power source terminals 67, 68 for energizing the starting relay magnet when the starting switch 63 is momentarily closed. The starting relay has an armature carrying a movable contact 70, a normally engaged back contact 71, and a front contact 72 connected through the holding coil 61 to the elevating switch back contact 57.

The controlled frequency power source has one terminal 68 connected through conductors 75, 76 to one terminal each of the elevating and reversing power motor terminals 77, the other elevating motor terminal 78 being connected by conductors 79 to the elevating switch movable contact 56. The other power source terminal 67 is connected by conductor 66 to the front elevating switch contact 58, and also to the starting relay movable contact 70, whereby when the starting coil is momentarily energized said power source terminal 67 is connected through the contacts 70, 72, the holding coil 61 and the elevating switch contacts 56, 57 and conductor 79 to the elevating terminal 78 of the power motor until the test piece closes contacts 41, 42 and the timing circuit is established, thus starting the clock, whereupon the timed relay magnet 55' becomes energized, breaking the circuit through the holding coil 61, dropping the relay movable contact 70, and holding the movable contact 56 of the elevating switch engaged with the normally disengaged contact 58 until the test piece lifts the major load, separating the contacts 47, 48, whereupon the timed relay magnet becomes deenergized and the elevating switch movable contact 56 is dropped to open the elevating switch 56, 58 to stop the elevation of the test piece.

The reversing circuit of the main power motor means includes a limit switch 85, 86 which may be mounted in any convenient position, and is here shown mounted on the standard 11. This switch is normally open but is inherently biased closed and has one terminal 86 connected by conductor 87 to the other reversing motor terminal 88. A bracket 89 adjustably mounted on the elevating screw is adapted to engage the member 86 and hold open the limit switch when the screw 16 is in lowered position.

Associated with the reversing circuit is also a reversing switch 90, 91 controlled by the timed relay magnet and having a movable contact 90 connected by an insulating bar 92 to the armature 56, and by conductor 93 to the terminal 86 of the limit switch. The back contact 91 is connected to the back contact 71 of the starting relay.

When the test piece support has been raised and the timed relay magnet and starting coil deenergized, the power source terminal 67 is connected through the movable contacts 70, 90, and back contacts 71, 91, the closed limit switch 85, 86, to motor terminal 88, to cause the motor 28 to lower the support until the limit switch is opened, whereupon the test piece support and the various relays and switches are in position for starting a new test.

Instead of or in addition to the timing clock 55 I may provide any suitable mechanism for recording the elapsed time between the application of the minor load and the lifting of the major load. Such mechanism may be mounted at any suitable place near or in another room remote from the tester, but is here shown as including an upright record-sheet supporting-frame 93 mounted transversely across the front of the base and provided at the corners with upper and lower spaced bearing parts 94, 95 receiving upper and lower horizontal roller shafts 96, 97 having rollers thereon and rotatably mounted in said bearing parts and having exterior knurled buttons 98 on the ends thereof. A backing plate 99 is disposed across the front of the frame in front of which is disposed a strip of suitably graduated record paper 100 having its end portions wound around and secured to said rollers.

A pair of transverse tracks 101 and an upwardly toothed rack 102 adjacent to one of them are disposed across the base in front of the frame; and a carriage 103 slidable on said tracks has a central opening 104 (Fig. 2) therein in which is pivoted an upright lever 105 for movement of its upper end toward and from the backing plate, a pencil 106 being mounted on said upper end for engagement at times with the record strip. An armature 107 on the lower end of the lever is positioned to be attracted by an electromagnet 108 mounted fast under the table, and connected by conductors 109 in parallel with the clock 55 to force the pencil to the record strip. A synchronous motor power clock 110 fast on said carriage and connected by the conductors 109 in parallel with the clock 55 has a timing shaft having a drive pulley 111 thereon connected by a belt 112 to a pulley 113 fast on a pinion shaft rotatably mounted in the lower part of the carriage parallel with the timing shaft and having fast thereon a pinion 115 meshed with said rack, whereby the power clock may drive the carriage.

Whenever the circuit through the clocks is complete, said electromagnet 108 is energized, the pencil applied to the record sheet 100, and the carriage 103 is at uniform speed moved transversely of the sheet causing on the sheet a pencil record whose length is an inverse function of the hardness. A spring 117 tensioned between the carriage and a pin in the base returns the carriage to the stop after each test.

The knurled knobs 98 form means for feeding the record strip a line at a time after each test. However, automatic means may be provided, which will now be described. An electromagnet 118 mounted on said frame and having its coil connected by conductors 119, 109 parallel with the clocks 55, 110 is adapted to attract a pivoted armature 120 to the free end of which is connected a pending hook pawl 121 adapted to engage a rachet 122 fast on the upper roller shaft 96 which ratchet is moved a notch on each upstroke of the pawl. A spring 123 raises said pawl when the magnet is deenergized, whereby the record strip is fed a line space when the magnet is deenergized at the end of each test.

The operation of the tester of Figs. 1 and 2 will be readily understood from the foregoing and need now be only briefly summarized as follows:

With the test piece support 17 lowered, the switches 63 and 85, 86 open and the carriage 103 drawn to its normal position by the spring 117, a piece 18 to be tested is placed on the support 17 and the switch 63 closed. This energizes the starting magnet coil 62 establishing a current path from terminal 67 through contacts 70, 72, coil 61, contacts 57, 56, conductor 79 and the elevating motor 27 and conductors 76, 75 to terminal 68, thus raising the test piece until contacts 41, 42 are closed, energizing magnets 55′, 108, and 118, pressing the pencil 106 to the record strip 100 lowering the pawl 121 and starting clocks 55 and 110.

Energizing the magnet 55′ continues the current to the elevating motor 27 through contacts 58, 56. As long as the timing circuit 50, 51, 52, 53 is closed the clock 55 counts the time and the clock 110 causes the pencil to mark on the record strip.

As soon as the major load is lifted separating the contacts 47, 48, the clocks and pencil marking stop, the magnets 55′, 108, 118 are deenergized the pencil retracted and the pawl 121 is raised to feed the strip one line.

The deenergization of magnet 55′ drops the movable contacts 56 and 90 to the lower position, establishing a circuit through contacts 70, 71, 91, 90, 85, 86 and the reversing motor 28 to lower the test piece support until the contacts 85, 86 are separated stopping the test piece support ready to receive another test piece.

Figure 4:
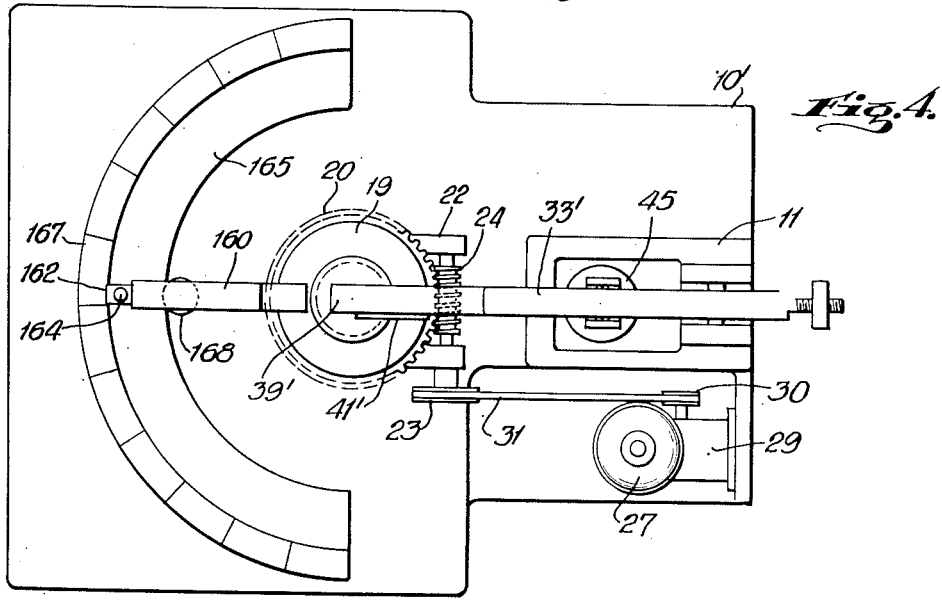
Fig. 4 is a plan of the tester of Fig. 3.

The form of invention of Figs. 3 and 4 comprises a base 10′ having as in Fig. 1 an opening in its mid-part receiving a bearing bushing 14 receiving an elevating screw 16 on which is disposed an internally threaded collar 19 carrying fast thereon a worm wheel 20 engaged by a worm 24. The controlled frequency synchronous motor means 27, 28 and its connection with the worm 24 whereby the worm wheel is rotated and the screw raised or reversed at uniform speed is also the same as in Figs. 1 and 2.

The substantially horizontal beam 33′ fulcrumed near its rear end on the standard 11 and carrying a major load 45 is formed with a forward end portion of shallow depth, thereby to provide an elongated resilient minor load portion 39′, carrying on its free end a downwardly pointed penetrator 43 disposed over the test piece support. A strain gauge 41′ secured to a side face of the resilient portion cooperates with the major load contacts 47, 48 to control the timing circuit 50′, 51′ of the clock 55 as will now be explained, conductors 152, 153 connecting the strain gauge 41′ in series between the C-battery and the grid G of amplifier tube T. The normally closed major load contacts 47, 48 respectively carried by the beam and standard are connected by conductors 52′, 53′ to a relay coil 154 in series between the B-battery and the plate P of the tube.

When the raising of the test piece presses upon the penetrator and flexes said resilient portion 39' and the strain gauge 41', plate current will energize the relay magnet 154 attracting the armature contact 155 to the contact 156 thus connecting said clock in series between the terminals 157 of a source of controlled frequency current, whereby when the test specimen engages the penetrator, plate current will energize the relay magnet 154, close contacts 155, 156 and start the clock 55, which will continue to run until the major load is lifted, contacts 47, 48 separated, the plate current broken, the magnet 154 deenergized and the clock current stopped, thereby measuring the time required to raise the major load, which time is an inverse function of the hardness.

I also provide means for recording the test time of the apparatus of Fig. 3, said means comprising a radial bracket 160 mounted fast on said threaded collar 19 and having a down-pointed end 161 carrying a lever 162 intermediately pivoted on said end and having an armature 163 on its inner end and on its outer end a downwardly pointed pencil 164 engageable with an arcuate record card 165 on an arcuate table 166 under the pencil concentric with said collar 19 on which card an arcuate graduated paper weight 167 rests.

An electromagnet 168 fast on said bracket over, and adapted when energized to attract, said armature is connected by conductors 169 in parallel with the clock 55, whereby when the timed circuit 50', 51' is complete, the pencil will be pressed to the paper and uniformly moved by the bracket 160 and collar 19 a distance proportional to the clock running time thereby to draw an arc whose length is an inverse function of the hardness.

The motor elements 27, 28 may be controlled from the timing circuit 50', 51' as in Figs. 1 and 2, or as here shown merely by separate conductors 175, 176 from a controlled frequency source 177, manual switches 178 and 179 being interposed in the conductors respectively.

If desired, the motor means of either species herein may be operated by the motor control means of Fig. 1 or 3 or any other suitable test-piece elevator control. In the motor control of Fig. 3 it is only necessary to close the switch 178 until the test piece rises and flexes the strain gauge 41' effecting the energization of the magnet 154, completing the timing circuit 50', 51', energizing the clock 55 and magnet 168 pressing the pencil 164 to the card marking the card as the collar 19 rotates, until the beam rises, separating the contacts 47, 48 breaking the timing circuit, stopping the clock 55 and withdrawing the pencil 164. Then the operator opens the switch 178 and closes the switch 179 until the test piece support is lowered a convenient amount, whereupon a new card 165 is put in place and the tester is ready for another test.

In Fig. 5 is shown a modified form of mounting for the penetrator and the minor load means.

In this form of the invention the frame 10, 11, the elevating screw 16, the means for raising the screw and the mounting of the beam 33a may be the same as in Figs. 1 to 4.

In Fig. 5 the free end of the beam is provided with a vertical bore 37a, over and coaxial with the test piece support 17; and the minor load means includes a loading rod 43a slidable in said bore and carrying coaxially on its lower end a cylindrical body 43b carrying the penetrator 43.

The upper end portion of the rod carries fast thereon a collar 39a, on which removably rests a minor load weight 39b having an axial bore 39c receiving the rod 43a.

Upper and lower normally separated minor load contact rings 41a, 42a are respectively mounted on and insulated from the lower face of the beam 33a and the upper face of said body 43b out of electrical contact with the loading rod. The timing circuit in which said contacts are interposed may be the same as in Fig. 1.

The operation of the parts of Fig. 5 are substantially the same as in Figs. 1 and 2, except that in Fig. 5, when the major load is raised, the major load and the minor load stresses are added on the penetrator.

The invention claimed is:

1. In combination, a penetrator; means for effecting relative approach and relative application of the penetrator to a test piece and effecting relative application of a load means to the penetrator at constant speed to effect progressive penetration until the force of the load means is substantially overcome; and timing means for measuring the elapsed time between the beginning of the application of said load means and the time said force is substantially overcome.

2. In combination, a penetrator; a definite load means; means for causing relative approach and effective engagement of the penetrator with a test piece and effecting relative application of said load means to the penetrator for causing said load means to relatively move the penetrator into the test piece at constant speed to effect progressive penetration until the force of the load means is substantially overcome; and timing means for measuring the elapsed time between the beginning of said application of said load means and the time the force of said load means is overcome.

3. In combination, a test piece support; a penetrator; means for effecting engagement of the penetrator with a test piece on the support; means for applying a minor load to the penetrator; a major load means; means for causing said major load means after the application of the minor load, to relatively move the penetrator to the test piece at constant speed to effect progressive penetration; and timing means for measuring the elapsed time between beginning of the application of the major load means and the time the force of said load means is overcome.

4. In combination, a test piece support; a penetrator support carrying a penetrator; power means adapted for causing relative approach of said supports at constant speed; minor load means constructed, positioned and adapted for application to the penetrator for yieldably resisting said approach when the penetrator is engaged by a test piece on the support; major load means constructed, positioned and adapted for application to the penetrator when the minor load means is effectively applied for yieldably resisting said approach to effect progressive penetration until the resistance of said load means is overcome; and timing means for measuring the elapsed time between the beginning of the application of the major load means and the time the resistance of said load means is overcome.

5. In a combination as in claim 4, apparatus controlled by the timing means after the minor load means is applied for causing said power means to effect said approach until the major load means is applied.

6. A combination as in claim 4 comprising means for maintaining operation of the power means when started to effect said approach before and after the minor load is applied, and means operatively connected to the timing means for causing separation of the supports after the major load is applied.

7. In combination, operating means for effecting continuous yieldable relative constant-speed approach of a penetrator and a test piece until engagement, penetration and resistance to penetration causing cessation of penetration are effected; a motor means for actuating said operating means to effect said approach and reversible to effect separation of the penetrator and the test piece; and timing means set in operation by said engagement and stopped by the cessation of penetration, for measuring the elapsed time between said engagement and cessation.

8. In combination, a test piece support; a penetrator support carrying a penetrator; means for causing relative approach of a definite predetermined speed pattern of said supports until engagement of the penetrator with a test piece on the test piece support is effected; means for applying a load means to the penetrator for yieldably resisting movement of the penetrator when engaged by a test piece on the test piece support during said approach, whereby the penetrator is caused to progressively penetrate the test piece until the resistance of said load means is overcome, effecting movement of the load means; and means controlled by said engagement and movement for measuring and indicating the elapsed time between said engagement and said movement of the load means.

9. A combination as in claim 8 comprising a timed relay operatively connected to the timing means for energizing the relay magnet during said elapsed time; a starting relay having a magnet adapted to be energized at will and having a holding coil; means cooperating with said relays for energizing the holding coil and motor means for causing said approach when the timed relay magnet is deenergized and the starting relay magnet is energized, and when the timed relay magnet is energized; and means cooperating with said relays and motor means for deenergizing the holding coil and reversely energizing the motor means for causing said separation after said elapsed time has elapsed.

10. In a hardness tester, a beam having means whereby the beam may be fulcrumed on a frame and intermediately carrying means for supporting a load and provided at the free end with an upper member and a lower minor load spring member and carrying a pair of normally disengaged engageable electrical contacts on said members respectively; said beam carrying on its lower face an insulated electrical contact.

11. In combination, a frame; a test piece support mounted on the frame for up and down movement; means operatively connected to the support for raising and lowering the support; a beam fulcrumed on the frame and intermediately carrying a major load and provided at the free end with an upper member and a lower minor load spring member; a pair of normally disengaged engageable minor load electrical contacts on said members respectively; a pair of upper and lower normally engaged major load electrical contacts respectively carried by the frame and an intermediate part of the beam and normally supporting the beam and major load; timing means; and an electrical timing circuit in which said timing means and contacts are connected in series.

12. In combination, a test piece support; a penetrator support carrying a penetrator; means for causing relative approach at constant speed of said supports until movement of the penetrator relative to its support is effected; a load means constructed, positioned and adapted for application to the penetrator for yieldably resisting movement of the penetrator during said approach to effect progressive penetration until the resistance of said load means is overcome, thereby effecting successive movements of the respective load means; timing means for measuring the elapsed time between said movements; a support for a record sheet; means controlled by the timing means for relatively moving a marking means across the sheet during said elapsed time.

13. A combination as in claim 12, comprising means controlled by the timing means for relatively moving said sheet transversely to the path of the marker after each movement of the marker.

14. In combination, a frame, a test piece support; means for raising the support at constant speed; a beam fulcrumed on the frame and carrying a major load, and a penetrator over the support; minor load electrical contacts closed by the penetrator when pressed by the test piece; major load electrical contacts opened when the beam rises; an electrical circuit in which said contacts are connected; a supporting frame; rollers rotatably mounted on said supporting frame; a record strip secured on said rollers; parallel tracks and rack; a carriage on said tracks movable transverse and parallel to the face of the strip; a lever pivoted on said carriage; a pencil on the lever for engagement with the strip; an armature on the lever; an electromagnet mounted on the carriage adapted to attract the armature to force the pencil to the strip; a synchronous motor in said circuit and on said carriage; and a pinion rotatably mounted on the carriage in mesh with said rack, and operatively connected with the motor.

15. A combination as in claim 14 comprising an electromagnet mounted on said supporting frame and having its coil connected to said circuit; a pivoted armature attracted by said magnet; a pawl connected to the armature; and a ratchet fast on one of the rollers and engaged by the pawl.

16. In a hardness tester, a beam adapted to be fulcrumed at one end on a tester frame and having a resilient free end portion having a free end and carrying a penetrator at its free end; and an electrical strain gauge secured along said portion and constructed and adapted to be interposed in a control circuit; and an insulated electrical contact carried on the lower face of an intermediate part of the beam and adapted to engage an electrical contact carried by said frame.

17. In combination, a frame; a test piece support; motor power means for raising the support at constant speed; a beam fulcrumed at one end on the frame and having a resilient free end portion carrying a penetrator at its outer end over the support; amplifying means having a power circuit and a control circuit controlling the power circuit; a strain gauge secured along said portion and interposed in said control circuit; upper and lower contacts carried by the beam and frame and interposed in the power circuit; a relay having its magnet coil in the power circuit; and a timing circuit closed by said relay when said magnet is energized.

18. In combination, a frame; a screw slidably mounted in the frame and forming a test piece support; a penetrator carried by the frame and opposing said support; a collar rotatable on the frame and having internal threads receiving the screw; a bracket carried by said collar; a marking means movably carried on the bracket; a record card opposite to the marking means; means for rotating said collar; and means for pressing the marking means against the card.

19. In combination, a screw; a threaded collar thereon; a test piece support on the screw; a penetrator support carrying a penetrator directed toward and engageable with a test piece on the test piece support; means for rotating the collar; a card supporting device; a marking device; and means operatively connecting one of said devices with said collar for moving one of said devices to cause marking to be effected.

20. In combination, a frame; an elevating screw vertically slidably mounted in the frame and forming a test piece support; a downwardly pointed penetrator carried by the frame over said support; a collar rotatable on the frame and having internal threads receiving the screw; a bracket carried by said collar; a lever thereon carrying an armature and a pencil; a record card supported beneath the pencil; an electromagnet carried on the bracket and adapted to attract the armature to move the pencil against the paper; means for rotating said collar; and means for energizing the magnet during penetration of the penetrator.

21. In combination a frame; an elevating screw vertically slidably mounted in the frame and forming a test piece support; a beam carrying a major load, and a penetrator over the support; minor load electrical contacts cooperatively connected to the penetrator and to be thereby closed when the penetrator is pressed on by the test piece; major load electrical contacts carried by the beam and frame and opened when the beam and major load are raised; a timing circuit in which said contacts are connected in series; a collar rotatable on the frame and having internal threads receiving the screw; a bracket carried by said collar; a lever thereon carrying an armature and a pencil; a record card supported beneath the pencil; an electromagnet carried on the bracket and adapted to attract the armature to move the pencil against the paper, the magnet being interposed in said timing circuit; and means for rotating said collar in either direction at uniform speed.

22. In combination, a member carrying a downwardly pointed penetrator; means for raising a test piece under the penetrator at uniform speed; a minor load body and a major load body adapted to be successively lifted by said member; and means for measuring the elapsed time between the lifting of said bodies.

23. In combination, a frame; means thereon for raising a test piece at uniform speed; a beam fulcrumed on the frame and carrying a major load; a minor load body carried on the beam and vertically movable on the beam and carrying a downwardly pointed penetrator over the test piece; insulated upper and lower normally separated engageable minor load electrical contacts mounted on the beam and body respectively; insulated upper and lower normally closed major load electrical contacts respectively carried on said beam and frame; and a timing circuit in which said contacts are interposed in series.

24. In combination, a frame; an elevating screw vertically slidably mounted on the frame and forming a test piece support; means engageable with the threads of the screw for raising the screw at uniform speed; a beam fulcrumed at one end on the frame and carrying a major load and having at the free end a vertical bore over the test piece support; a minor load means comprising a loading rod slidable in said bore and carrying coaxially on its lower end a cylindrical body carrying at its lower end a penetrator point, the upper end portion of the rod carrying a minor load weight; upper and lower normally separated minor load electrical contact rings mounted on and insulated from the lower face of the beam and the upper face of said body out of electrical contact with the rod; upper and lower normally closed major load contacts respectively carried by and insulated from, on the lower face of the intermediate part of the beam a part of the frame immediately thereunder; and a timing circuit in which said contacts are interposed in series.

25. In combination a test piece support; a penetrator support carrying a penetrator; means for causing relative approach and separation of said supports; a load means mounted, positioned, constructed and adapted for application to the penetrator for yieldably resisting movement of the penetrator when engaged by a test piece on the test piece support during said approach, whereby the penetrator is caused to progressively penetrate the test piece until the resistance of said load means is overcome, effecting movement of the load means; means for indicating that the load is applied the instant when the load is applied; means for indicating that the load means is overcome the instant when the load means is overcome; whereby the elapsed time between said instants is a function of the amount of penetration of the penetrator; and means for measuring and indicating said elapsed time.

26. In combination a test piece support; a penetrator support carrying a penetrator; means for causing relative approach and separation of said supports; load means mounted, positioned, constructed and adapted for application to the penetrator for yieldably resisting movement of the penetrator when engaged by a test piece on the test piece support during said approach, whereby the penetrator is caused to press upon and progressively penetrate the test piece until the resistance of said load is overcome, effecting movement of the load means; a member positioned to be moved by the cooperation and relative movement of the penetrator support and the load means when the load is first applied; a member moved by the movement of the load means when the load means resistance is overcome; whereby the elapsed time between the movements of the members is a function of the amount of said penetration; and timing means controlled by said members for measuring said elapsed time.

27. In combination a test piece support; a penetrator support carrying a penetrator; means for causing relative approach and separation of said supports; minor and major load means mounted, positioned, constructed and adapted for application to the penetrator for yieldably resisting movement of the penetrator when engaged by a test piece on the test piece support during said approach, whereby the penetrator is caused to press upon and progressively penetrate the test piece until the resistance of said load means are successively overcome, effecting successive movements of the respective load means; a member positioned to be moved by the cooperation and relative movement of the penetrator support and major load means just before the major load is first applied; a member positioned to be moved by the movement of the major load means when the major load means is overcome; whereby the elapsed time between the movements of the members is a function of the amount of said penetration; and timing means controlled by said members for measuring said elapsed time.

28. In combination a test piece support; a penetrator support carrying a penetrator; means for causing relative approach and separation of said supports; minor and major load means mounted, positioned, constructed and adapted for application to the penetrator for yieldably resisting movement of the penetrator when engaged by a test piece on the test piece support during said approach, whereby the penetrator is caused to progressively penetrate the test piece until the resistance of said load means are successively overcome, effecting successive movements of the respective load means; a pair of contact members mounted and positioned to be moved into engagement with each other by the cooperation and relative movement of the penetrator support and major load means when the major load is first applied; a pair of contact members mounted and positioned to be disengaged and moved by the movement of the major load means when the major load means is overcome; whereby the elapsed time between said engagement and disengagement of said pairs is a function of the depth of said penetration; and timing means controlled by said pairs of contacts for measuring said elapsed time.

29. A testing method which comprises causing approach at uniform speed of a test piece support toward a penetrator support carrying a penetrator; applying a load to the penetrator thereby yieldably resisting movement of the penetrator when engaged by a test piece on the test piece support during said approach until the resistance of said load means is overcome, thereby effecting movement of the load; and measuring the elapsed time between said engagement and said movement as a function of hardness of the test piece.

30. A testing method which comprises causing relative approach of a definite predetermined speed pattern and separation of a test piece support and a penetrator support carrying a penetrator; successively applying to the penetrator a minor and a major load for yieldably resisting movement of the penetrator when engaged by a test piece on the test piece support during said approach, whereby the penetrator is caused to press upon and progressively penetrate the test piece until the resistance of said loads are successively overcome, effecting successive movements of the respective loads; whereby the elapsed time between said successive movements of the members is a function of the amount of penetration; and measuring and indicating said elapsed time as a function of hardness of the test piece.

31. A hardness testing method which comprises causing relative approach of a test piece having substantially constant hardness throughout the test and a pointed penetrator having transverse cross sections progressively larger as they are more remote from the point of the penetrator; continuing said approach until the penetrator effects engagement with the test piece; continuing said approach with force at constant speed from the time of said engagement, thereby causing progressive penetration of the penetrator until the cross-section of the penetrated part of the specimen becomes progressively larger until said force is overcome by the resistance of the test piece, causing cessation of penetration; and measuring the elapsed time between said engagement and cessation as a function of hardness of the test piece.

32. A testing method which comprises causing relative approach at constant speed of a test piece and a penetrator support carrying a penetrator movable thereon; applying to the penetrator a minor load for yieldably resisting motion of the penetrator relative to its support when engaged by the test piece during said approach, thereby effecting resisted movement of the penetrator relative to said support during said approach; then applying a major load to the penetrator to resist movement of the penetrator during said approach, thereby causing the penetrator to progressively penetrate the test piece until the resistance of said major load is overcome, thereby effecting movement of the major load relative to said support; and measuring the lapsed time between said effected movements as a function of hardness of the test piece.

33. In combination, means for effecting continuous yieldable relative constant speed approach of a penetrator and a test piece until engagement penetration and resistance to penetration causing cessation of penetration are effected; and timing means for measuring the elapsed time between said engagement and cessation.

34. In combination a test piece support adapted to carry a test piece; a load support carrying a penetrator directed toward the test piece; means for causing relative approach at constant speed of said supports, thereby causing relative approach and engagement of the test piece and penetrator; load means mounted for motion toward and from the supports and pressing the penetrator toward the test piece and limited in motion toward the test piece by the load support and mounted and constructed for yieldingly resisting motion of the penetrator after said engagement and during said approach thereby causing the penetrator to progressively penetrate the test piece until the resistance of said load means is overcome, thereby effecting movement of the load means on the load support; and means for measuring the elapsed time between said engagement and said movement.

DAVID F. SKLAR.

REFERENCES CITED

The following references are of record in the file of this patent:

UNITED STATES PATENTS

| Number | Name | Date |
|---|---|---|
| 989,471 | Abraham | Apr. 11, 1911 |
| 1,225,438 | Howard | May 8, 1917 |
| 1,762,497 | Wilson | June 10, 1930 |
| 1,771,858 | Mohr | July 29, 1930 |
| 1,839,093 | Geyer et al. | Dec. 29, 1931 |
| 1,931,925 | Hopkins | Oct. 24, 1933 |
| 2,053,472 | Gogan | Sept. 8, 1936 |
| 2,129,043 | Bortsch | Sept. 6, 1938 |
| 2,259,491 | Roller | Oct. 21, 1941 |
| 2,316,975 | Ruge | Apr. 20, 1943 |
| 2,319,208 | Clark | May 18, 1943 |
| 2,333,747 | Sklar | Nov. 9, 1943 |
| 2,375,341 | Bishop et al. | May 8, 1945 |
| 2,426,390 | De Forest | Aug. 26, 1947 |

FOREIGN PATENTS

| Number | Country | Date |
|---|---|---|
| 26,574 | Great Britain | 1910 |
| 806,089 | France | Sept. 14, 1936 |
| 700,521 | Germany | Dec. 21, 1940 |